UNITED STATES PATENT OFFICE.

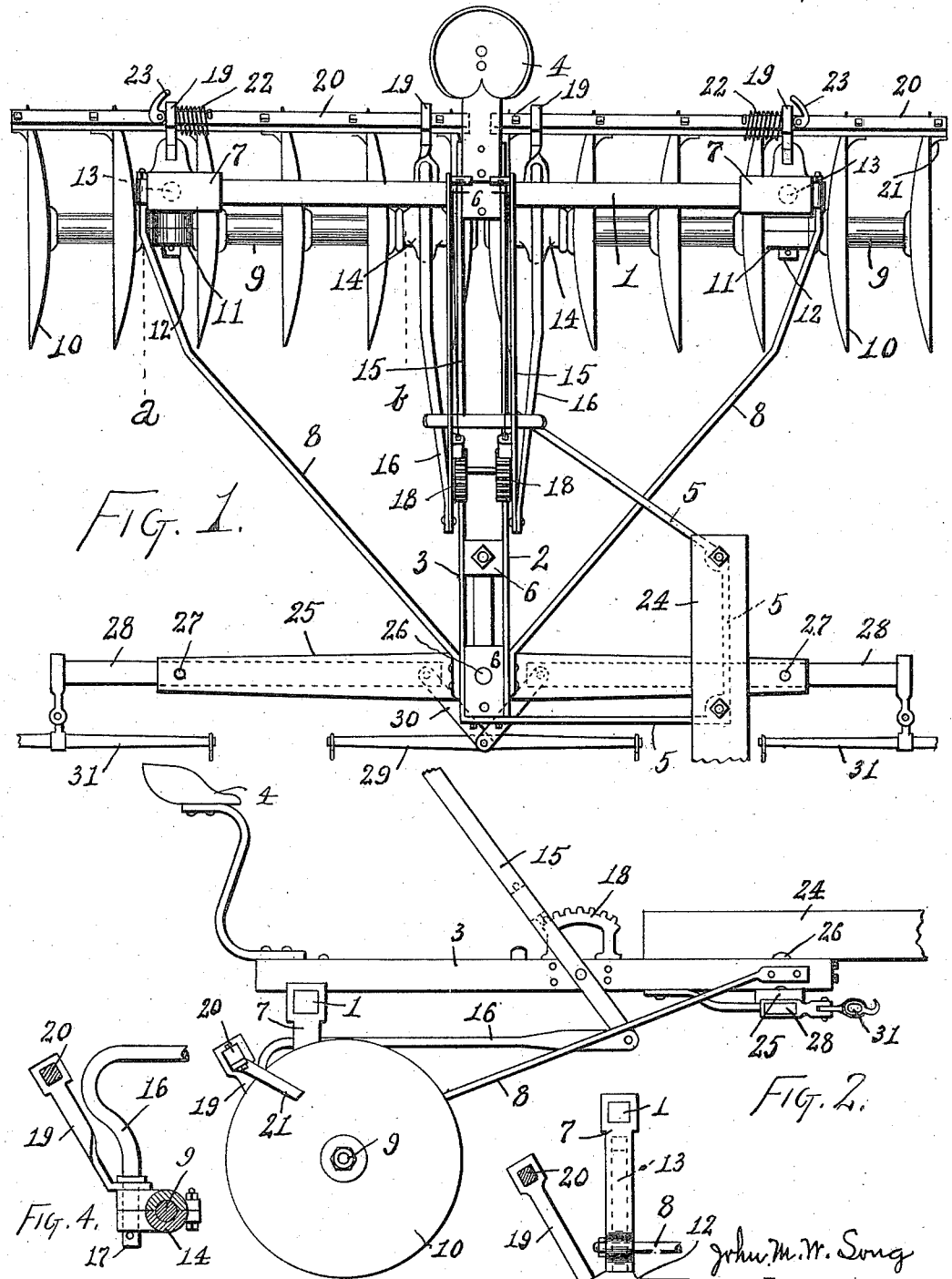

JOHN M. W. LONG, OF HAMILTON, OHIO, ASSIGNOR TO THE LONG & ALLSTATTER COMPANY, OF SAME PLACE.

DISK HARROW.

SPECIFICATION forming part of Letters Patent No. 579,487, dated March 23, 1897.

Application filed December 30, 1895. Serial No. 573,688. (No model.)

*To all whom it may concern:*

Be it known that I, JOHN M. W. LONG, of Hamilton, Butler county, Ohio, have invented certain new and useful Improvements in Disk Harrows, of which the following is a specification.

This invention relates to improvements in disk harrows, which will be understood from the following description, taken in connection with the accompanying drawings, in which—

Figure 1 is a plan of a disk harrow embodying my improvements and suited for use with three horses; Fig. 2, a side elevation thereof; Fig. 3, a vertical section in the plane of line *a* of Fig. 1, and Fig. 4 a vertical section in the plane of line *b* of Fig. 1.

In the drawings, 1 indicates a square frame-bar extending transversely across the implement; 2, a horizontally-disposed flat bar set vertically edgewise and having its rear end rigidly secured to about the center of length of bar 1; 3, a similar bar parallel with bar 2 and but a little distance from it, bars 2 and 3 forming a frame part projecting forward from bar 1; 4, the driver's seat supported on a standard at the rear end of bars 2 and 3; 5, a prolongation of bar 3 sidewise from its front end, this bar 5 then turning rearwardly and then turning inwardly, its inner rear extremity attaching to about the mid-length of bar 2, bar 5 forming a tongue-frame at one side of the forward ends of bars 2 and 3 and having eyes at its angles for the reception of bolts to hold the tongue; 6, spacing-blocks disposed between bars 2 and 3 at their front ends and rear ends and intermediately and serving with the bars 2 and 3 to form the central frame part of the implement; 7, an arm rigidly secured to and projecting downwardly from each end of frame-bar 1, each of these arms being vertically bored to form bearings at the rear of the gang-shafts; 8, hounds with their rear ends attached to the bases of arms 7 and with their forward ends attached to the forward ends of the central frame formed by bars 2 and 3; 9, the two gang-shafts disposed in the line below the bar 1 and with their inner ends near to but separated from each other; 10, the disks secured, as usual, to the gang-shafts; 11, bearings on journals of the gang-shafts near their outer ends, each of these bearings having a bearing-eye at right angles to its gang-shaft; 12, elbow-journals with their upper members journaled in the vertical bearings of arms 7 and with their horizontal members journaled in the bearing-eyes of bearings 11; 13, the vertical journals of the elbows 12; 14, bearings upon the gang-shafts near their inner ends and provided also with vertical bearing-eyes; 15, hand-levers within reach of the driver pivoted to the sides of the central frame-bars, their lower ends projecting below the central frame-bars; 16, links pivoted at their forward ends to the levers 15 and at their rear ends engaging the vertical bearing-eyes in gang-shaft bearings 14; 17, the vertical journals on the links 16, engaging the vertical bearing-eyes of the bearings 14; 18, detent-segments for holding the levers 15 in adjusted position; 19, brackets projecting rearwardly and upwardly from the four gang-shaft bearings; 20, scraper-bars, one for each gang-shaft, sliding in eyes in the upper ends of brackets 19; 21, scrapers secured to bars 20 and engaging the sides of the harrow-disks; 22, springs, one for each scraper-bar, engaging between projections on the bars and contiguous supporting-brackets and tending to urge the scraper-bars endwise to bring the scrapers into action upon the sides of the disks; 23, cams pivoted to the scraper-bars and acting against contiguous brackets 19 and serving when the cams are turned to move the scraper-bars endwise against the resistance of the springs and move the scrapers away from the disks and hold them out of action; 24, the tongue with its rear end resting upon and bolted to the side frame formed by bar 5; 25, a tripletree with its center pivoted at the forward end of the central frame formed by bars 2 and 3; 26, the central pivot of the tripletree, uniting it to the frame; 27, pivots at the ends of the tripletree; 28, levers pivoted to the tripletree on pivots 27, these levers projecting outwardly from the pivots 27, their inner ends projecting inwardly about twice as far; 29, a singletree at the center of the implement; 30, links connecting this singletree with the inner ends of levers 28, and 31 singletrees at the outer ends of levers 28.

When three horses are to be used, the harrow is arranged, as in Fig. 1, with two horses at one side of the tongue and one horse at the other side, the central horse coming at the center of width of the harrow, the hitching device forming an evener.

When two horses are to be employed, then the tongue, instead of being bolted to the side frame formed by bar 5, is moved over into the central frame formed by bars 2 and 3 and blocks 6, which have holes to receive the tongue-bolts; and when thus using two horses an ordinary doubletree takes the place of tripletree 25. When four horses are to be employed, then the tongue retains its central position, just referred to, and tripletree 25 is retained, but ordinary doubletrees are hitched at pivots 27, levers 28, &c., being omitted. If the scrapers are held out of action by cams 23, the turning of the cams permits the springs to act and bring the scrapers to their work.

If levers 15 be thrown forward, the inner ends of the gang-shafts will be thrown rearwardly, bearings 14 swiveling on journals 17 of links 16 and bearings 11 pivoting on journals 13 of arms 7. As the inner ends of the gang-shafts rise and fall the horizontal journals of elbows 12 come into play to permit of the motion.

I claim as my invention—

1. In a disk harrow, the combination substantially as set forth, of a frame, arms projecting downwardly from the ends of the frame, elbows vertically journaled in said arms and having a vertical and horizontal longitudinal journal, gang-shaft bearings forward of the vertical journals of said elbows and supported on the horizontal journals thereof, hounds extending from the bases of said arms to the front of said frame, bearings near the inner ends of the gang-shafts, forwardly-extending links vertically journaled to said bearings, and adjusting-levers mounted on the frame parts and connected with the forward ends of said links.

2. In a disk harrow, the combination, substantially as set forth, of frame-bar 1, arms 7 depending from the ends thereof, bars 2 and 3 connected with bar 1, spacing-blocks 6 between bars 2 and 3, hounds 8 from the bases of arms 7 to the front of bars 2 and 3, levers mounted on bars 2 and 3, elbows journaled in arms 7, and having each a vertical and horizontal journal, bearings 11 journaled on said elbows, gang-shafts journaled in said bearings and having harrow-disks, bearings 14 on the gang-shafts, and links 16 connected to the last-mentioned bearings and to said levers.

JOHN M. W. LONG.

Witnesses:
J. W. SEE,
SAM D. FITTON, Jr.